United States Patent [19]

Madsen

[11] 4,370,778

[45] Feb. 1, 1983

[54] METHOD, A BINDER, AND AN APPARATUS FOR BINDING SAUSAGE CASINGS

[76] Inventor: Erik Madsen, Jens Juulsvei 13, 8260 Viby J., Denmark

[21] Appl. No.: 211,806

[22] Filed: Dec. 1, 1980

Related U.S. Application Data

[63] Continuation of Ser. No. 962,917, Nov. 22, 1978, abandoned, which is a continuation-in-part of Ser. No. 748,158, Dec. 7, 1976, abandoned.

[30] Foreign Application Priority Data

Dec. 12, 1975 [GB] United Kingdom ............... 51015/75
Mar. 23, 1976 [GB] United Kingdom ............... 11700/76
Nov. 23, 1977 [GB] United Kingdom ............... 48826/77

[51] Int. Cl.³ ............................................. A22C 15/00
[52] U.S. Cl. .................................... 17/45; 24/30.5 R; 24/115 M; 24/30.5 L; 17/44.4; 53/480
[58] Field of Search ............... 17/44, 44.1, 44.2, 44.3, 17/44.4, 1 R; 53/134, 480; 24/30.5 R, 30.5 P, 30.5 L, 136 A, 136 L, 115 M

[56] References Cited

U.S. PATENT DOCUMENTS

| | | | |
|---|---|---|---|
| 432,539 | 7/1890 | Mains | 24/30.5 R |
| 1,368,545 | 2/1921 | Childers | 24/30.5 R |
| 3,002,240 | 10/1961 | Laguerre | 24/30.5 L |
| 3,113,408 | 12/1963 | Kirkpatrick et al. | 24/90 HA |
| 3,132,390 | 5/1964 | Boden | 24/30.5 L |
| 3,182,365 | 5/1965 | Crawford | 24/30.5 L |

FOREIGN PATENT DOCUMENTS 1306881 9/1962 France ............................... 24/30.52

Primary Examiner—Willie G. Abercrombie
Attorney, Agent, or Firm—Paul M. Craig, Jr.

[57] ABSTRACT

A novel sausage casing binder made of elements of plastic and a method by which the elements are mounted against the constricted portion of the casing so as to form a clamp ring thereabout, whereafter the elements are joined to stabilize the rigid and entirely closed annular shape of the clamp ring in secure engagement with the constricted portion. For binding the casing in the end which is going to be suspended by the smoking of the sausage a binding element is used which is provided with a suspension member forming an integral part thereof, whereby the use of special suspension members to be laid under the clamp is obviated and a very safe suspension is obtained.

30 Claims, 19 Drawing Figures

U.S. Patent  Feb. 1, 1983  Sheet 1 of 4  4,370,778
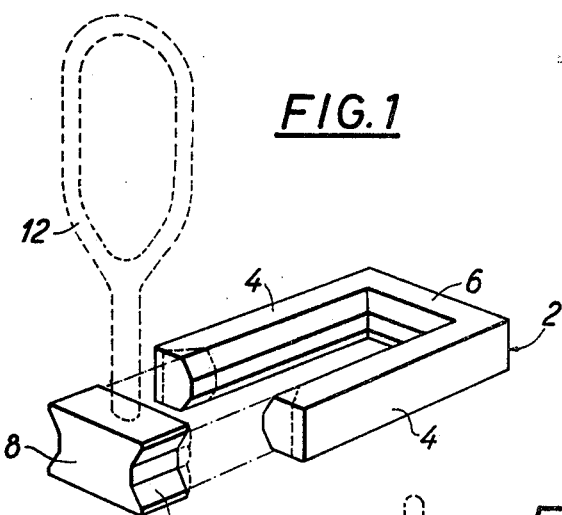
FIG.1
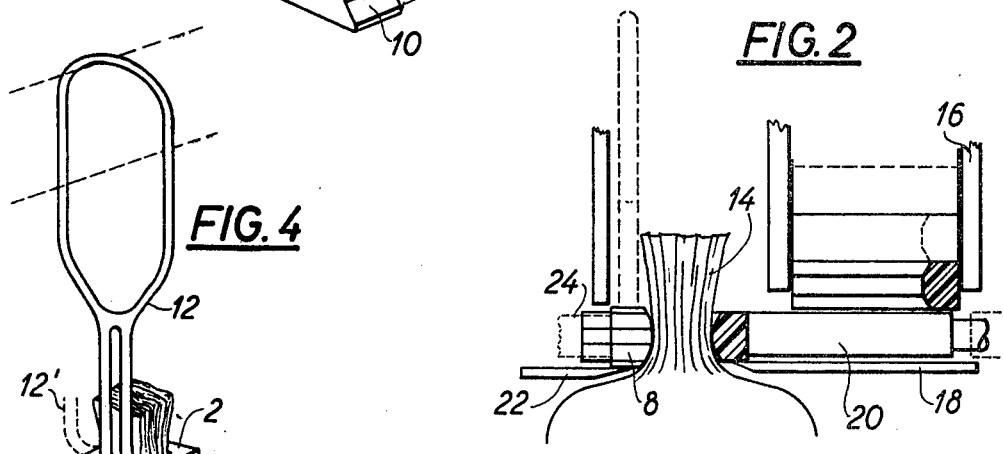
FIG.2
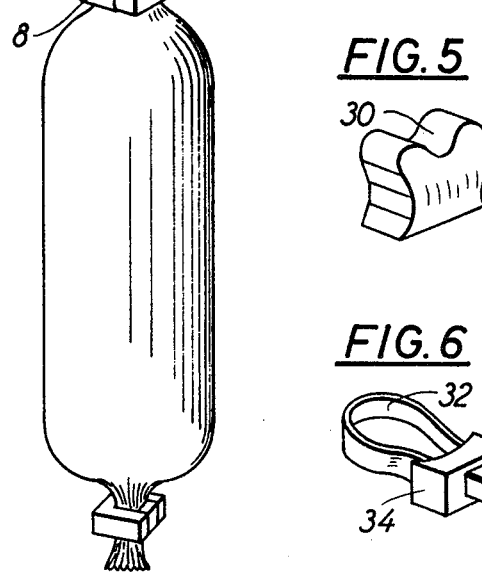
FIG.4
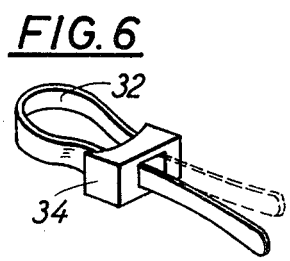
FIG.5
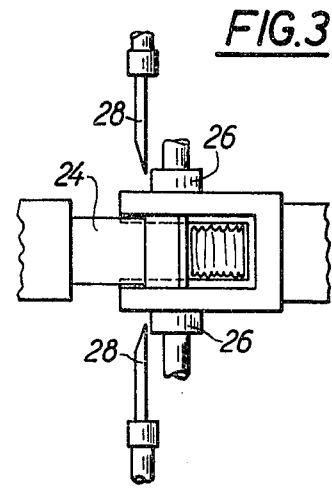
FIG.3
FIG.6

METHOD, A BINDER, AND AN APPARATUS FOR BINDING SAUSAGE CASINGS

BACKGROUND AND SUMMARY OF THE INVENTION

This application is a continuation of application Ser. No. 962,917, filed Nov. 22, 1978, which in turn is a continuation-in-part of my U.S. application Ser. No. 748,158 filed Dec. 7, 1976, both now abandoned.

This invention relates to a method of binding sausage casings whereby a clamp is mounted across a constricted casing portion in order to stabilize the constriction. The invention relates particularly, though not exclusively, to such bindings which serve not only to close the sausage casing, but additionally to hold a suspension member enabling the sausage to be suspended on a rod or the like in connection with a usual smoking treatment of the sausage.

Originally the ends of sausage casings were closed by tied string pieces, but in modern production it is preferred to use metallic clips which are easy to mount on the casings simply by introducing them radially over the constricted casing end portions and forcing them to clamp about these portions. At one end of the sausage casing the said suspension member was originally constituted by a loop portion of the string piece used for the binding of the casing end, but in connection with the use of the said metallic clips it is now possible to use prefabricated loop members shaped either as tied loops having a thick knot portion at one end thereof or as cast plastic eye members having a stem or shaft portion, the outer free end of which is provided with a thickened material portion; in both cases the suspension member is mountable by placing a lower portion thereof so as to be clamped between the metallic clip and a side portion of the said constricted sausage casing portion with the said thick portion thereof located underneath the clip, whereby the clip will hold the upper loop or eye shaped portion of the suspension member against retraction from the sausage casing.

However, the known binding method involves some drawbacks, especially with respect to the use of the metallic clips, which may mechanically damage the casing material and—due to a considerable content of lead—even show a poisonous effect. As far as sausage suspension is concerned heavy sausages cause a considerable pull in the suspension members, and the corresponding pressure of the said thickened portion thereof against the clips will exert an opening action on the clips, whereby there is a certain waste of sausages falling down from the suspension rods in the smoke oven. For increased security the suspension members may be secured by means of two or even more clips placed one after the other, but this involves increased mounting time, clip consumption and casing material consumption.

It is the purpose of the invention to provide a binding method, binder and binding apparatus whereby it is possible to achieve an advantageous and effective binding in an easy manner.

The method according to the invention is characterized in that for forming the clamp one or more plastic elements are arranged about the constriction and forced or tightened thereagainst so as to form a split annular member, the closed annular shape of which is fixed by joining the material portions adjacent said split or splits or otherwise rigidly anchoring the elements together. Hereby is provided about the constriction a strong and entirely closed clamping ring of plastics which show no poisonous effect and is unlikely to damage the casing material.

At the suspension end of the sausage or sausage casing it will of course be possible to make use of the known suspension members which may be held safely by the clamping ring, but the invention provides for a possibility to completely avoid the special mounting operation of the suspension member, because when elements of plastic are used for forming the clamping ring it is possible to make use of elements shaped integrally with suitable suspension members, e.g., die cast with a suspension eye, or plastic suspension members may be welded to the elements. Hereby a very safe suspension binding is obtainable in an easy and inexpensive manner.

The invention further comprises a sausage binder and an apparatus for use with the method according to the invention, as defined in the appended claims.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a perspective view of a first sausage binder according to the invention;

FIG. 2 is a side view, partly in section, illustrating an arrangement for mounting of the binder on a sausage casing, FIG. 3 is a top view of the arrangement of FIG. 2;

FIG. 4 is a perspective view of a sausage ready to be suspended and closed at both ends by the method according to the invention;

FIG. 5 is a perspective view of a modified binder element;

FIG. 6 is a perspective view of a modified sausage binder according to the invention;

DETAILED DESCRIPTION OF THE PREFERRED EMBODIMENTS

Figure 7:
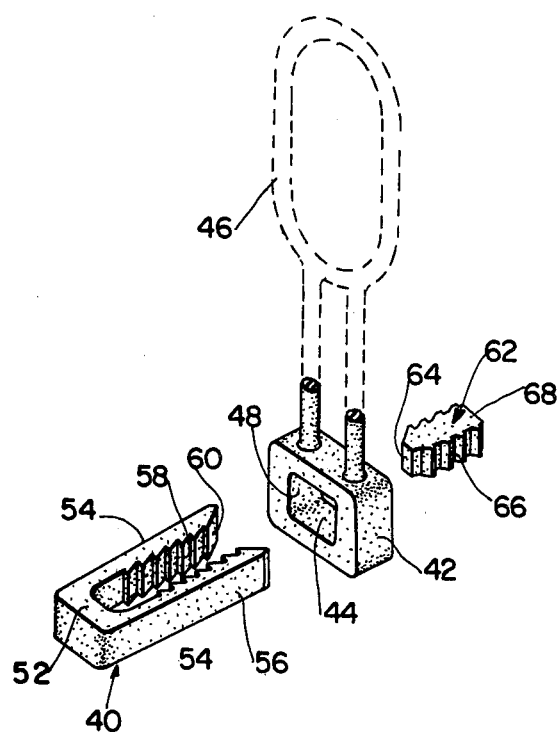
FIG. 7 is a perspective exploded view of a further binder according to the invention.

The sausage binder shown in FIG. 1 is made of weldable plastics such as nylon and comprises two parts, viz. a U-shaped part 2 having parallel legs 4 and a bottom portion 6, and a separate cross bar part 8 which is receivable between the legs 4. The inner sides of the legs are profiled in a convex manner while the end faces 10 of the cross bar 8 are correspondingly concavely profiled. The binder is usable simply by introducing the U-part 2 laterally over the constricted casing portion and forcing the cross bar 8 into the space between the legs and against the said casing portion, whereafter welding heat is supplied to the areas adjacent the ends of the cross bar 8 while the portions 6 and 8 are urged towards each other and thus against the constricted casing portion, and preferably by simultaneously applying a lateral pressing force urging the legs 4 against the cross bar ends 10. When the parts 2 and 8 have thus been welded together they form a ring member tightly closed about the constriction. The welding heat may be supplied by means of an ultrasonic welding head engaging the exterior side of the cross bar 8, whereby a single welding head is sufficient for closing the splits at both ends of the bar 8.

As shown in dotted lines in FIG. 1, the cross bar 8 may be provided with a suspension member 12, which could alternatively be connected with the U-shaped part 2. The inside corners of the exterior ends of the legs may be cut as oblique guiding surfaces.

FIG. 3 shows an end 14 of a sausage or a sausage casing placed in an application station for binders, comprising a magazine 16 for the U-shaped parts 2, a magazine bottom plate 18 and a piston 20 which in a manner not shown, is connected with means for reciprocating it along the bottom plate 18 for successively supplying U-parts 2 to the application position from one side. At the opposite side thereof is located, but not shown, a supply arrangement for successively feeding a cross bar part 8 to a position on a support 22 in which the bar is backed by a welding head 24. When a cross bar part is brought into this position the piston 20 is actuated to push a U-part 2 into a position about the constricted portion of the sausage casing until the bottom portion 6 of the U-part 2 is clamped against the casing; the outer ends of the legs 4 of the U-part 2 will then receive the cross bar 8 and project rearwardly therefrom, as also shown in FIG. 3. FIG. 3 additionally shows that in addition to the longitudinal clamping of the sausage casing between the clamp portions 6 and 8 a transverse clamping of the leg portions 4 against the ends 10 of the cross bar 8 may be effected by means of clamping shoes 26. When thereafter the welding head 24 is actuated to heat the cross bar 8 the ends of this element will get welded to the respective inner sides of the legs 4, whereby a rigid clamp ring is formed about the constricted sausage casing portion.

For a subsequent release of the sausage or sausage casing from the clamp application station the two arrangements located at the opposite sides of the casing as illustrated by FIGS. 2 and 3 may be movable away from each other, or one of the clamping shoes 26 may be swung away from its clamping position, whereafter upon retraction of the welding head 24 and the piston 20 the sausage casing end may be moved laterally out of the slot defined between the supports 18 and 22.

As shown in FIG. 3 the free leg ends projecting beyond the cross bar 8 may be cut off by means of knives 28 or other suitable cutting means.

The interior side of the cross bar is preferably curved in a convex manner as apparent from FIG. 2, whereby when the parts are clamped together the cross bar will engage the casing material with a concentrated pressure, though in a gentle manner due to the said convexity, and when the welding is accurately controlled it is achievable that the cross bar material is softened such that some material from the interior side of the cross bar enters into the folds of the casing, whereby the resistance against axial tear off of the binder from the sausage end is increased considerably. Generally for obtaining this advantage in connection with suspension binders it would be possible to effect softening of further or all portions of the closed plastic ring member.

FIG. 4 shows a finished sausage ready to be suspended on a support rod. The figure shows a preferred embodiment of the cross bar 8 as provided with the suspension member 12. In practice it is preferable that the suspension member is associated with the cross bar instead of with the U-part, because both parts are then easier to handle automatically. It should be mentioned that the suspension member may be arranged so as to project not in the longitudinal direction as shown, but radially outwardly, whereby a row of lying sausages may be conveyed directly onto a smoking rod, from which they will then hang down with the bendable suspension members correspondingly bent, as illustrated by a stem portion 12' as shown in dotted lines.

In FIG. 5 is shown a cross bar element having no suspension member. For facilitating automatic handling of the element it is shaped with a groove 30 whereby it is guidable along a guiding rod.

It will be appreciated that a closed plastic clamp ring member may be assembled or provided about the constricted casing portion in a variety of different manners and with starting elements of any suitable designs, e.g. two curved or angular members instead of a U-part and a straight cross part. Moreover, as illustrated in FIG. 6, the binder may have a bendable strap portion 32 cooperating with a holder block 34, the ends of the strap being drawn through a passage in the block and thereafter secured to the block, e.g. by welding. One end of the strap is shown in dotted lines, because one strap end may be previously secured to the block, e.g. by being die cast in one piece with the block. The block may additionally be provided with a suspension member 12 as an integral part.

Though as mentioned welding will be the preferred way of joining the ring forming elements, it will nevertheless be possible to join them or otherwise cause a rigid fixation of the clamping ring structure by other means, e.g. by cementing or riveting or—as an extreme example—by clamping together by means of a metallic clip the free ends of the U-legs 4 extending beyond the cross bar 8 as viewed in FIGS. 2 and 3 to thereby lock the cross bar in its clamping position. The binder shown in FIG. 6 has some similarity with a known type of cable bunch holders, in which, however the strap 32 is provided with kind of teeth or barbs cooperating with a holding edge inside the block 34 to prevent retraction of the strap loop; such an anchoring system might be usable in connection with a sausage binder according to the invention, though the binders for security should have to be produced with a very high degree of accuracy, especially binders for use at the suspension end of the sausage casing, whether or not provided additionally with an integral suspension member.

The method according to the invention will generally be well suited to be carried out automatically, but it is not the purpose of this invention to disclose more detailed methods and equipment of special advantage in this respect, and for this reason the apparatus illustrated in FIGS. 2 and 3 has been shown and described schematically.

The binder as shown in FIG. 7 comprises a holding ring member 42 having an aperture 44 and preferably (though not necessarily) having an associated, integral suspension eye member 46. The opposed lateral sides 48 of the generally rectangular aperture 44 are smooth and converge towards the left, i.e. towards the front side of the member 42. The binder further comprises a bifurcated U-shaped member 50 having a base portion 52 and two spaced leg portions 54 each having a smooth outer side 56 and a toothed inner side 58. Adjacent the front end of the legs 54, the inner sides 58 are tapering outwardly as shown at 60. The binder finally comprises a wedge member 62 having a narror front end surface 64 and toothed lateral sides 66 which diverge from each other towards the rear end 68 of the wedge member 62.

Figure 8:
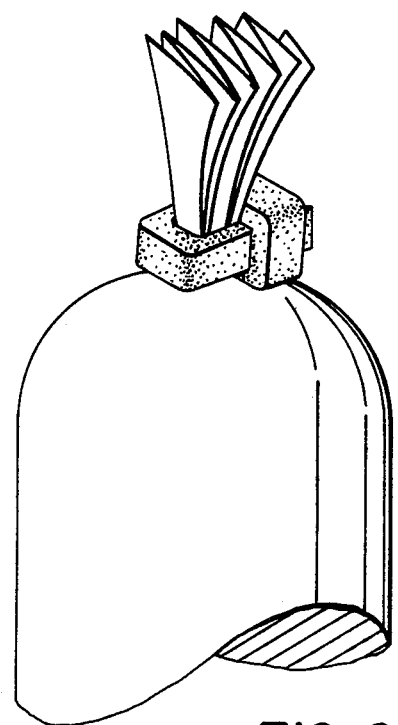
FIG. 8 is a perspective view of the FIG. 7 binder shown in its actuated position on one end of a sausage.

In use, as will be explained in more detail below, the holding ring member 42 is placed at one side of a sausage casing constriction, and the U-member 50 is placed opposite thereto and then forced into the aperture 44, whereafter the wedge member 62 is forced into the space between the legs 54 of the U-member 50. If desired, the portions of the legs 54 thereafter projecting behind the holding ring member 42 may thereafter be cut away, and the final result of the operations will be as shown in FIG. 8.

Figure 9:
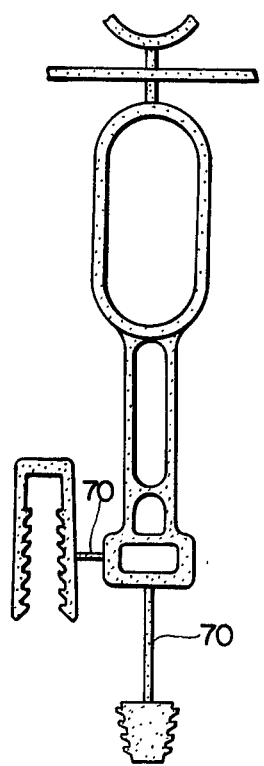
FIG. 9 is a plan view illustrating the production of the FIG. 7 binder by pressure casting.

The three parts of the binder are preferably made of nylon, and they may be cast in one operation as illustrated in FIG. 9, and a plurality of such castings may be piled in a magazine in which the connection strings 70 are automatically cut and the single binder parts are thereafter automatically brought into their initial operative positions as illustrated in FIG. 7, by means of a suitable handling equipment not illustrated.

Figure 10:
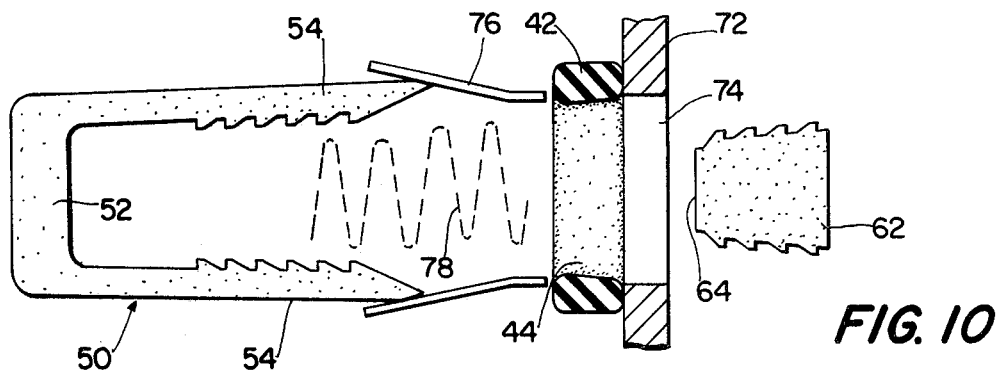
FIGS. 10–12 are plan views illustrating the manner of using the FIG. 7 binder.

The said initial positions are shown in FIG. 10 also. The holding member 42 is backed by a rigid support element 72 having a slot or aperture 74 behind the aperture 44 of the member 42. In front of the member 42 is arranged a pair of rigid guiding members 76 converging towards the aperture 4 and receiving between their outer ends the free ends of the leg portions 54 of the bifurcated member 50. The sausage casing portion to be bound is designated 78 and is received in the space confined by the bifurcated member 50, the guiding members 76 and the front side of the holding member 42.

Figure 11:
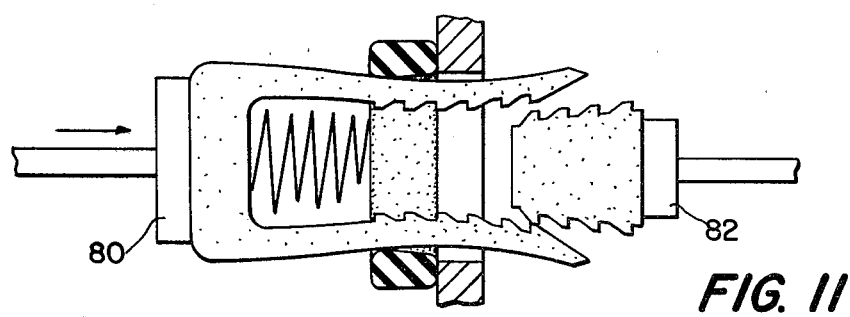

As a first step for mounting the binder the bifurcated member 50 is forced towards the holding member 42 by means of a pressing element 80 as shown in FIG. 11, whereby the legs 54 are guided through the aperture 44 and the sausage casing is compressed between the base portion 52 of the member 50 and the front side of the holding member 42, to the desired degree, by applying to the pressing element 80 a predetermined pressure of e.g. 50 kp. The wedge element 62 is located just behind the holding member 42, supported by a movable support 82, and the wedge member in this position will serve to spread the front ends of the legs 54 of the member 50 as these are moved through the aperture 44.

Figure 12:
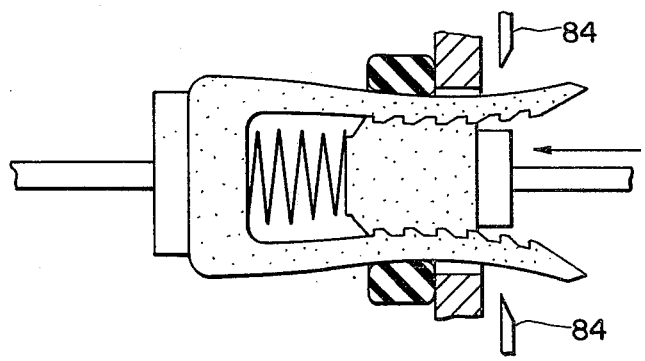

Thereafter, with the pressing element 80 held in its position, the support 82 is caused to be moved towards the left as shown in FIG. 12, so as to force the wedge member 62 into the space between the leg portions 54 until the front end of the wedge member abuts the compressed sausage casing, i.e. until the front end thereof registers with the front side of the holding member 42 (FIG. 12). The dimensions of the various members are so adapted that in the said advanced position of the wedge member a very firm clamping of the leg portions 54 occurs between the wedge member 62 and the side portions of the holding member 42, and generally the wedge member will prevent the bifurcated member 50 from being retracted from the holding member.

Preferably as shown in FIG. 12, the free ends of the legs 54 are cut off by mans of suitable knife elements 84 adjacent the rear end of the wedge member 62, and when the pressing member 80 is retracted the finished binder may be taken away from the support element 72.

Figure 13:
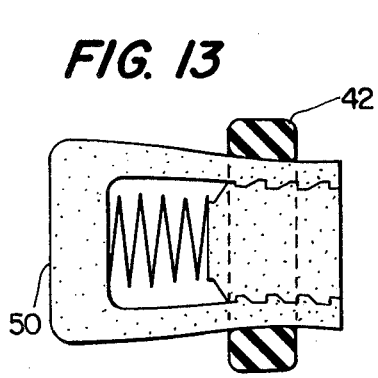
FIG. 13 is a corresponding view illustrating the situation in which retraction has occurred.

In use, if retraction forces are applied to the bifurcated member 52 relative to the holding member 42, especially if according to FIG. 7 the holding member is provided with a suspension eye member 46 and used for the suspension of the sausage, it may happen that the bifurcated member 50 is retracted somewhat from the holding member 42, but as illustrated in FIG. 13, this will result in the wedge member 62 following the bifurcated member in an unchanged position relative thereto, whereby the sausage casing will remain effectively clamped between the base portion 52 of the bifurcated member and the front end 64 of the wedge member 62, even though the sausage casing is leaving its engagement with the front side of the holding member 42, i.e. the firm clamping of the sausage casing will be maintained.

Figure 14:
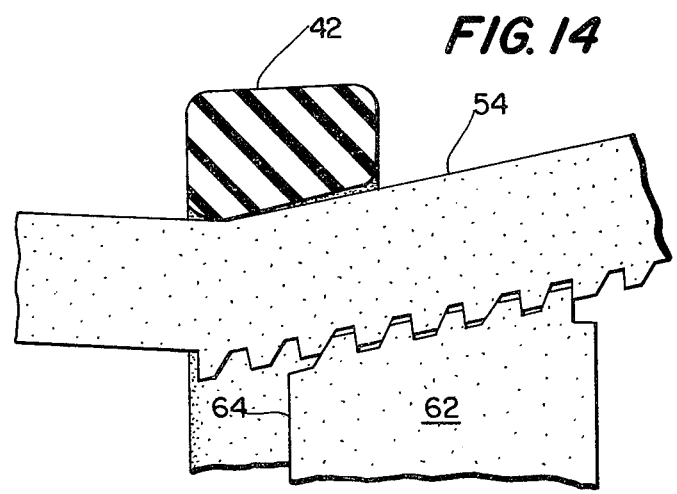
FIG. 14 is a more detailed, fragmentary view of portions of the FIG. 7 binder.

The cooperating parts of the three members are shown in a larger scale in FIG. 14, in which the wedge member 62 is being forced into its mounted position. It will be appreciated that the behavior of the binder illustrated in FIG. 13 is conditioned by the fact that the friction between the inside of the leg portions 54 and the wedge member 62 is greater than the friction between the outside of the leg portions 54 and the inclined inner side walls 48 of the holding member 42, this in the example shown being obtained by the toothed engagement of the leg portions 54 with the wedge member 62. However, the desired effect is obtainable when the inner friction is just slightly larger than the outer friction, and it is not necessary, therefore, that the inner friction is obtained by means of a pronounced tooth engagement as illustrated; the cooperating surfaces of the wedge member and the leg portions 54 may merely be more rough than the outer cooperating surfaces of the leg portions 54 and the side walls 8 of the holding member 42.

Instead of using a separate bifurcated member 50, the holding member 42 may be integrally connected at one side with a strap member to be laid about the sausage casing and be introduced through the aperture 44 at the other side thereof, e.g. as illustrated in FIG. 14. In that case the tightening of the binder about the sausage casing or the like is obtainable by causing the free strap end to be drawn through the aperture.

In practice, the wedge member 62 need not be so long that it projects rearwardly from the holding member 42, at least not as far as according to FIG. 12.

Figure 15:
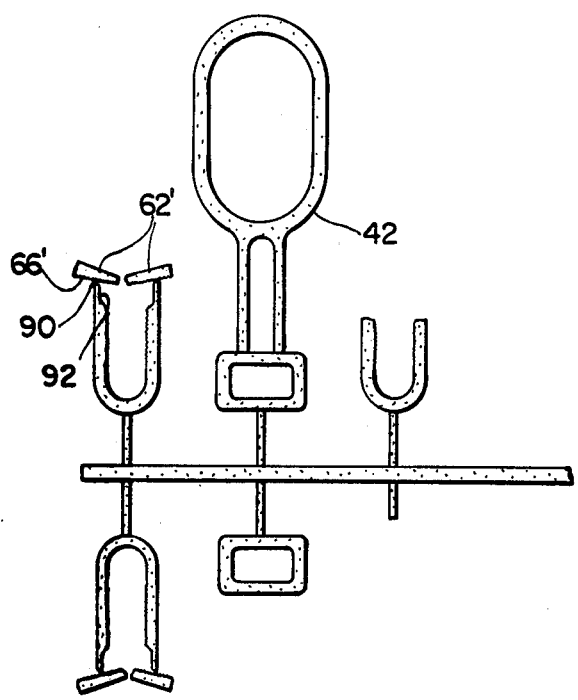
FIG. 15 illustrates a modification of the FIG. 7 binder wherein the binder part is formed of two half parts in its molded condition.

In FIGS. 15–18 is shown a preferred embodiment, in which the wedge member 62 is provided as a unitary part of the bifurcated member 50 or rather as two half parts 62' cast in direct connection, through narrow material portions 90, with the respective outer ends of the legs of the U-member 50, as shown in FIG. 15. Each of said half parts 62' is slightly wedge shaped and arranged generally crosswise to the leg end, and the thin, bendable and breakable material portion 90 connects the outer leg end with the top portion of one of the teeth of the toothing 66' of the side portion of the half part 62' facing the U-member 50. The inner side of the outermost leg portion is provided with a recess 92 operable to receive the innermost end of the associated half part 62' when the latter is bent inwardly about the hinge constituted by the material portion 90, such that the substantially smooth, innermost surface of said half part 62' will then be practically flush with the innermost, toothed side of the leg of the U-member. When the wedge half part 62' is bent into this position its outermost portion 94 will be located in front of the front end of the leg.

Figure 16:
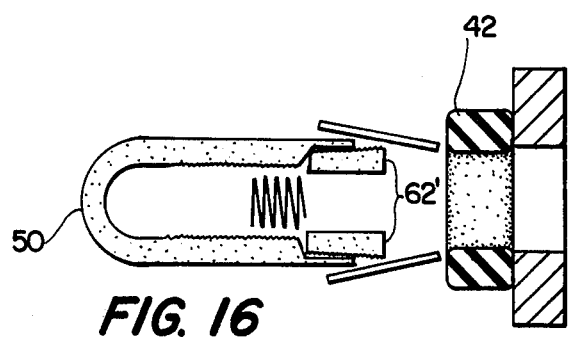
FIGS. 16–18 are views illustrating the manner of using the FIG. 15 binder.

When a U-member 54 according to FIG. 15 is used in almost the same manner as illustrated in FIG. 10 the first thing to happen is that the innermost ends of the wedge half parts 62' will engage the folded sausage casing portion 78, whereby said half parts are caused to be bent about the hinge portions 90 into the positions shown in FIG. 16, i.e. in which they constitute practically integrated end portions of the legs of the U-member 50. When thereafter the U-member 50 is pushed into the holding ring 42 (whether or not provided with a suspension eye member) the two half parts will be brought along to the position shown in FIG. 17, corresponding to FIG. 11, and it will be noted that the two half parts 62' are now brought more or less together so as to form a single, almost unitary wedge member.

Figure 17:
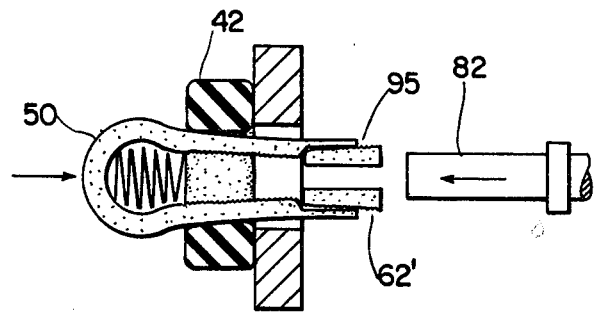
Figure 18:
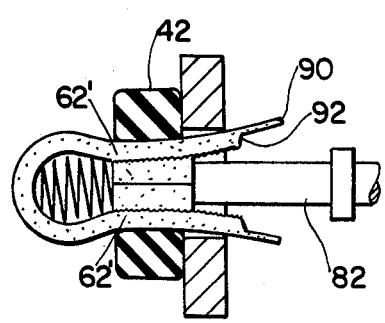

When thereafter, according to FIGS. 11 and 17, the pressure member 82 is moved towards the left, the first thing to happen will be that it engages the outermost ends of the wedge half parts 62' and forces these to the left relative to the U-member 50, whereby the material portions 90 will be broken and the two half parts 62' will be pushed inwardly between the legs of the U-member into a position shown in FIG. 18, corresponding to FIG. 12, in which the two half parts are forced against each other so as to form a unitary wedge block member locked by its outer toothed surfaces to the interior toothed sides of the U-member legs just as in FIG. 12 and FIG. 13.

It will be appreciated that the mechanical handling of the binding member will be highly facilitated by the fact that the wedge member (as two half parts thereof) remains associated with the U-member 50 until this has been introduced into the holding ring member 42, whereby special guiding means for the wedge member may be entirely avoided.

As apparent from FIGS. 16 and 17, it is preferred to arrange the folding of the sausage casing portion 78 such that the folded sausage casing wall portions extend generally lengthwise of the U-member 50 (contrary to what is shown in FIGS. 11 and 12), since hereby the tendency of the folded casing portion to expand above or outside the area engaged by the binder will increase and thus improve the stability of the sausage binding. Moreover, the said mechanical handling of the sausages will hereby be facilitated, because the casing portion 78 may be folded by a movement, e.g. on a rotary sausage or sausage casing carrying device bringing the folded casing portions 78 into a position ready for engagement by the binder when moved into this position perpendicularly to the direction of movement of the binder portions for effecting the binding of the sausage.

It will be noted that the bottom portion of the U-member 50 according to FIGS. 15–18 is rounded and not linear as in FIGS. 7–13, whereby it is ensured that the U-member 50 will be able to clamp against the holding ring 42 a folded sausage casing portion of any (small) size, as the said bottom portion will not in itself constitute any absolute hindrance against the U-member being pushed even the whole way through the holding ring member.

Figure 19:
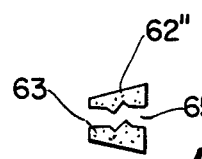
FIG. 19 shows binder element half parts with interfitting ridges and grooves.

FIG. 19 shows a modified form of wedge half-parts 62'' which are provided with interfitting ridges and grooves 63, 65, respectively. These ridges and grooves mate when the half-parts are moved from the FIG. 17 to the FIG. 18 position and thus prevent relative slippage and insure continued joined movement of the half-parts.

It is also pointed out that while toothed frictional engagement surfaces are provided on the inner surfaces of the legs of the U-shaped member 50 and the surfaces of the wedge member that engage therewith, due to the lateral clamping forces resulting from the wedging action produced by wedge member, U-shaped member, and holding member, a precise positional anchoring of the binder parts is obtainable that is not limited by the size or spacing of the teeth, and as noted above, these teeth can even be eliminated and replaced by roughened surfaces.

In this regard, it is noted that while it might be theoretically possible to provide precise positioning binder clamping elements by gripping teeth alone via the use of extreme fineness, teeth of such fineness could not likely withstand the relatively high opening forces which act upon a binder suspending sausages, especially where the binder is formed of molded or cast plastic materials. Furthermore, even slight expansion of the parts of the binder clamp ring after securement thereof will have adverse effects due to the slimy nature of the sausage casings as a result of the invariable presence of animal fats thereon.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A sausage binder comprised of two or more plastic elements being assemblable to form a closed, split clamping ring about a constricted area of a sausage casing and adapted to be rigidly anchored together in this shape, said elements comprising a U-shaped element having a pair of legs and a cross element having opposed end surfaces mountable so as to bridge and be secured with said end surfaces disposed between opposed inner portions of the legs of said U-shaped element, wherein said cross element is comprised of two half-pieces, and said half-pieces are provided with groove and ridge surfaces for interfitting with each other.

2. A sausage binder comprised of two or more plastic elements being assemblable to form a closed, split clamping ring about a constricted area of a sausage casing and adapted to be rigidly anchored together in this shape, said elements comprising a U-shaped element having a pair of legs and a cross element having opposed end surfaces mountable so as to bridge and be secured with said end surfaces disposed between opposed inner portions of the legs of said U-shaped element, wherein said plastic elements further comprise a holding element, said holding element having an opening into which the U-shaped member is insertable, said cross element being securable by a wedging action between said elements, wherein said cross element is comprised of two half-pieces, and each of said half-pieces are formed connected to a respective end of one of the legs of said U-shaped member by a thin, flexible, breakable strip.

3. A sausage binder according to claim 1 or 2, in which the opposite ends of the cross element are shaped with profiled grooves or protrusions for reception in or by correspondingly profiled protrusions or grooves, respectively, of the insides of the legs of the U-shaped element.

4. A sausage binder according to claim 1 or 2, further comprising a suspension member enabling the sausage to be suspended, the suspension member being provided as an integral part of plastic material forming one of the binder elements, said suspension member being separate from portions of said elements forming said split clamping ring.

5. A sausage binder according to claim 1 or 2, in which the suspension member is formed integrally with said cross element.

6. A sausage binder according to claim 1 or 2, wherein said cross element is constructed so as to be fixedly securable at any point achieved by an applied clamping force.

7. A sausage binder according to claim 1, wherein said end surfaces and said inner portions are roughened.

8. A sausage binder according to claim 1, wherein said end surfaces and said inner portions are provided with mutually engageable teeth.

9. A sausage binder according to claim 6, wherein said end surfaces and said inner portions are smooth.

10. A sausage binder according to claim 9, wherein said cross element has a forward surface that is shaped to prevent damage to a sausage casing disposed between said forward surface and said U-shaped member.

11. A clamp binder for clamping about a material portion such as a constricted end portion of a sausage casing, comprising a U-shaped member for insertion over the material portion from one side thereof, an apertured cross member mountable against the opposite side of the material portion so as to receive through its aperture the free leg ends of the U-member, with the material portion clamped between the cross member and the bottom portion of the U-member, and a wedge member adapted to be forced inwardly between the free leg ends from the rear or outer side of the cross member into a locking position in order to lock the U-member against retraction from the cross member, characterized in that the wedge member is premounted adjacent the outer end portion of the legs of the U-member in such a manner that it is introduceable through said aperture together with the leg ends and thereafter displaceable along the leg ends into said locking position, and is constituted by two separate halfpieces, each of which is associated with a respective U-member leg end and is located in respective recesses in the inner sides of the leg end portions.

12. A clamp binder for clamping about a material portion such as a constricted end portion of a sausage casing, comprising a U-shaped member for insertion over the material portion from one side thereof, an apertured cross member mountable against the opposite side of the material portion so as to receive through its aperture the free leg ends of the U-member, with the material portion clamped between the cross member and the bottom portion of the U-member, and a wedge member adapted to be forced inwardly between the free legends from the rear or outer side of the cross member into a locking position in order to lock the U-member against retraction from the cross member, characterized in that the wedge member is premounted adjacent the outer end portion of the legs of the U-member in such a manner that it is introduceable through said aperture together with the leg ends and thereafter displaceable along the leg ends into said locking position, and is constituted by two separate half-pieces, each of which is associated with a respective U-member leg end and is connected therewith by means of a thin and breakable material portion.

13. A clamp binder according to claim 12, in which the half-pieces are located in respective recesses in the inner sides of the leg end portions.

14. A clamp binder according to claim 11, in which the half-pieces are associated with the outer ends of the respective U-member legs through a short, thin and flexible material portion, each half-piece being oriented generally crosswise of the U-member leg so as to have a portion projecting inwardly from the respective leg end towards the plane of symmetry of the U-member.

15. A clamp binder according to any one of the claims 11 or 12, in which surface portions of said half-pieces engage each other when the half-pieces are laid together and are provided with interengaging tongue and groove means.

16. A clamp binder according to any one of the claims 11 or 13 in which the thickness of the respective half-pieces is so adapted that when the half-pieces are laid together their combined thickness added to the thickness of the opposed U-member legs will correspond to the cross dimension of the aperture in said cross member such that in the locking position of the combined half-pieces the front ends thereof will be located substantially flush with the front side of the cross member as engaging the material portion to be bound.

17. A clamp binder according to preceding claims 11 or 12, in which the said cross member is integrally provided with a suspension loop or eye member.

18. A method of mounting a clamp binder comprising a U-shaped member for insertion over the material portion from one side thereof, an apertured cross member mountable against the opposite side of the material portion so as to receive through its aperture the free leg ends of the U-member, with the material portion clamped between the cross member and the bottom portion of the U-member, and a wedge member adapted to be forced inwardly between the free leg ends from the rear or outer side of the cross member into a locking position in order to lock the U-member against retraction from the cross member, characterized in that the wedge member is premounted adjacent the outer end portion of the legs of the U-member in such a manner that it is introduceable through said aperture together with the leg ends and thereafter displaceable along the leg ends into said locking position on a material portion to be bound, characterized by the steps of placing the said cross member adjacent one side of the material portion and placing the said U-member outside the opposite side thereof, forcing by a predetermined force the cross member and the U-member together so as to cause the free legs of the U-member to embrace the said material portion and be introduced into and through the aperture of the cross member with said wedge member associated with the outer U-member leg end, maintaining said predetermined clamping force between the U-member and the cross member and causing said wedge member to be displaced towards said locking position by or upon breaking the connection between the wedge member and the end of the U-member leg portion, and finally releasing the clamp binder from the means for exerting the said predetermined clamping force.

19. A clamp binder according to claim 13, in which surface portions of said half-pieces engage each other when the half-pieces are laid together and are provided with interengaging tongue and groove means.

20. A clamp binder according to claim 14, in which surface portions of said half-pieces engage each other when the half-pieces are laid together and are provided with interengaging tongue and groove means.

21. A clamp binder according to claim 14, in which the thickness of the respective half-pieces is so adapted that when the half-pieces are laid together their combined thickness added to the thickness of the aperture in said cross member such that in the locking position of the combined half-pieces the front ends thereof will be located substantially flush with the front side of the cross member as engaging the material portion to be bound.

22. A clamp binder according to claim 15, in which the thickness of the respective half-pieces is so adapted that when the half-pieces are laid together their combined thickness added to the thickness of the aperture in said cross member such that in the locking position of the combined half-pieces the front ends thereof will be located substantially flush with the front side of the cross member as engaging the material portion to be bound.

23. A clamp binder according to claim 13, in which the said cross member is integrally provided with a suspension loop or eye member.

24. A clamp binder according to claim 14, in which the said cross member is integrally provided with a suspension loop or eye member.

25. A clamp binder according to claim 15, in which the said cross member is integrally provided with a suspension loop or eye member.

26. A clamp binder according to claim 16, in which the said cross member is integrally provided with a suspension loop or eye member.

27. A clamp binder for clamping about a material portion such as a constricted end portion of a sausage casing, comprising a U-shaped member for insertion over the material portion from one side thereof, an apertured cross member mountable against the opposite side of the material portion so as to receive through its aperture the free leg ends of the U-member, with the material portion clamped between the cross member and the bottom portion of the U-member, and a wedge member adapted to be forced inwardly between the free leg ends from the rear or outer side of the cross member into a locking position in order to lock the U-member against retraction from the cross member, characterized in that the wedge member is premounted to legs of the U-member so as to be located adjacent its ends in such a manner that it is introduceable through said aperture together with the leg ends and thereafter displaceable along the leg ends into said locking position.

28. A clamp binder according to claim 27, wherein the wedge member is constituted by two separate half-pieces, each of which is associated with a respective U-member outer leg end portion.

29. A clamp binder according to claim 28, wherein said half-pieces are located in respective recesses in the inner sides of the leg end portions.

30. A clamp binder according to claim 27 or 28 or 29, comprising a suspension member, said suspension member being an integral part of plastic material forming said apertured cross member.

* * * * *